(12) United States Patent
Mohanan et al.

(10) Patent No.: US 12,298,930 B2
(45) Date of Patent: May 13, 2025

(54) TRANSLATING PROTOCOLS FOR WIRE REQUESTS IN A COMPUTING ENVIRONMENT

(71) Applicant: Truist Bank, Charlotte, NC (US)

(72) Inventors: Murali Mohanan, Mariette, GA (US); Noel Ciminello, North Dartmouth, MA (US)

(73) Assignee: Truist Bank, Charlotte, NC (US)

(*) Notice: Subject to any disclaimer, the term of this patent is extended or adjusted under 35 U.S.C. 154(b) by 112 days.

(21) Appl. No.: 18/108,189

(22) Filed: Feb. 10, 2023

(65) Prior Publication Data
US 2024/0273045 A1     Aug. 15, 2024

(51) Int. Cl.
| | |
|---|---|
| G06F 13/38 | (2006.01) |
| G06F 16/2458 | (2019.01) |
| G06Q 20/10 | (2012.01) |
| G06Q 40/02 | (2023.01) |

(52) U.S. Cl.
CPC ........ G06F 13/385 (2013.01); G06F 16/2477 (2019.01); G06Q 20/10 (2013.01); G06Q 40/02 (2013.01)

(58) Field of Classification Search
CPC ... G06F 13/385; G06F 16/2477; G06Q 20/10; G06Q 40/02
See application file for complete search history.

(56) References Cited

U.S. PATENT DOCUMENTS

| | | | |
|---|---|---|---|
| 10,395,234 B1* | 8/2019 | Greenwald | G06Q 20/36 |
| 2005/0071512 A1* | 3/2005 | Kim | G07F 7/1008 |
| | | | 710/1 |
| 2020/0160285 A1* | 5/2020 | Thorson | G06Q 20/10 |
| 2021/0051142 A1* | 2/2021 | Cu Castro | G06F 9/452 |
| 2021/0182809 A1* | 6/2021 | Sukhija | G06Q 20/326 |
| 2022/0122075 A1* | 4/2022 | Bardouille | G06Q 20/405 |

* cited by examiner

*Primary Examiner* — Raven E Yono
(74) *Attorney, Agent, or Firm* — Kilpatrick Townsend & Stockton LLP; Michael A. Springs, Esq.

(57) ABSTRACT

Computing environments can translate protocols for wire requests received from third-party applications according to some aspects described herein. For example, a processing device can receive a wire request transmitted from a first wire-transfer application. The wire request can be provided from the first wire-transfer application according to a first protocol via a first interface. The processing device can generate a translated wire request that is compatible with a second protocol associated with a second interface for a second wire-transfer application. The wire request can be translated to the second protocol based on characteristics of the wire request. The processing device can transmit the translated wire request to the second wire-transfer application, which can generate an automated process for processing the translated wire request. The automated process can be executed before a wire requested by the wire request is performed between two entities.

20 Claims, 3 Drawing Sheets

TRANSLATING PROTOCOLS FOR WIRE REQUESTS IN A COMPUTING ENVIRONMENT

TECHNICAL FIELD

The present disclosure relates generally to computing environments and, more particularly (although not necessarily exclusively), to translating protocols for wire requests in a computing environment.

BACKGROUND

Computer environments can perform interactions such as wire transfers between two or more computer systems. For instance, the interactions can involve data that is transmitted from a first computer system to a second computer system. In some cases, such interactions must be transmitted to a processing application under a particular protocol in order to be processed. After processing the interaction, the processing application can transmit the processed interaction to an interaction application that can perform the interaction between the first computer system and the second computer system. In some cases, interactions may be manually entered into the processing application, such as by an administrator, upon request from a user associated with the first computer system.

DETAILED DESCRIPTION

Figure 1:
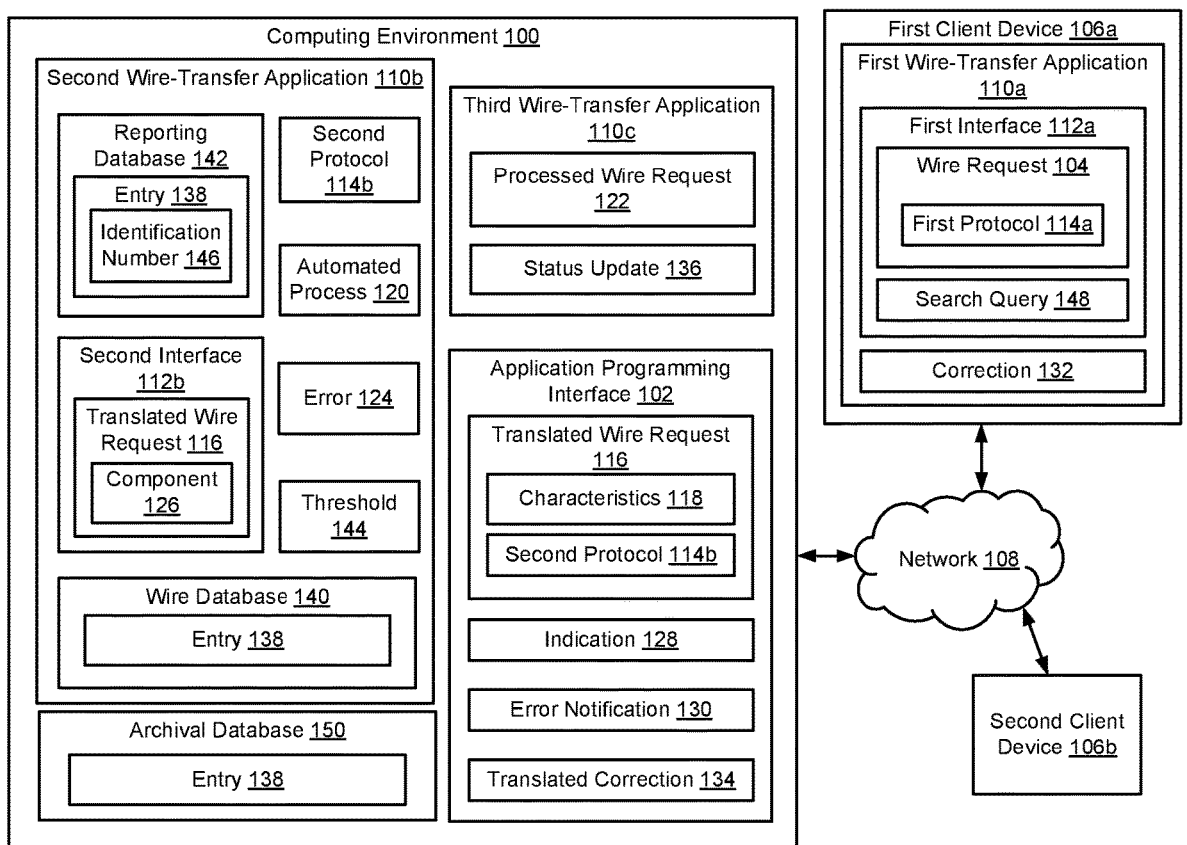
FIG. 1 is a block diagram of an example of a computing environment for translating protocols for wire requests according to some examples of the present disclosure.

Applications that process wire transfer requests (also referred to herein as wire requests) may require that such requests be received according to a particular protocol (e.g., format). The wire requests may originate from a user associated with an organizational entity that wishes to perform a wire transfer between the organizational entity and another party. But wire requests may need to be manually entered into a processing application by an administrator, because the processing application may not be available to the user that wishes to perform the wire transfer. In some cases, a third-party application associated with the organizational entity can interface with the processing application to submit wire requests. But the processing application and the third-party application may have different interfaces and different protocols for transmitting data related to the wire request. This may lead to interoperability problems resulting from incompatibilities of the protocols. In particular, the computing environment executing the processing application may have difficulty executing processing operations if the protocols do not match. For example, the computing environment may not process wire transfers as efficiently or may fail altogether as a result of the incompatibility between the protocols. These interoperability problems may also result in increased bandwidth consumption and wasteful processing due to kickbacks or other errors. Further, once a wire request is transmitted and processed, the processing application may identify errors in the wire request to be corrected before a successful wire transfer can be performed. But third-party applications attempting to correct those errors may do so in an improper format or according to the wrong protocol, which may further exacerbate the problems.

Some examples of the present disclosure overcome one or more of the abovementioned problems by using an application programming interface that can receive wire requests transmitted through an interface for a third-party application with a particular protocol. The application programming interface can translate the wire requests to another protocol required by an application that processes wire requests. Thus, wire requests can be transmitted through third-party applications, without requiring requests to be transmitted to the processing application. Additionally, the application programming interface can translate protocols of error notifications and corrections transmitted between the processing application and the third-party application. These translations can avoid the interoperability issues described above, thereby reducing wasteful consumption of bandwidth and computing resources.

In some examples, the processing application can be different from another application that actually performs the wire transfers, which can be referred to as the wire transfer application. The processing application can be configured to performing preprocessing on the wire transfers to, for example, identify errors in the wire transfers before the wire transfers are actually attempted by the wire transfer application. This can separate the pre-processing from the actual wire transfers, which can help improve the responsiveness and reduce latency in the wire transfer application.

In some examples, the processing application can periodically copy wire transfer records from the wire transfer application and store them in a reporting database. Thus, when the user requests status updates on wire transfers, the application programming interface can redirect the request to instead be fulfilled by the processing application. The processing application can determine the status update from the copied records in the reporting database. By determining status updates via the reporting database, the wire transfer application can focus on the wire transfer task and avoid expending processing power on the reporting, which can reduce latency and improve responsiveness of the wire transfer application.

In one particular example, a client device associated with an organizational entity located in New York City can transmit a wire request to an application programming interface for a processing application that processes wire requests. The wire request can request a wire transfer of $10,000 from the organizational entity to another organizational entity located in London. The wire request can be transmitted under a first protocol. This first protocol may differ from a second protocol required by the processing application. For example, the wire request may be received in a first file format. The application programming interface can translate the wire request to the second protocol, such as by transforming the wire request into a second file format. Then, the application programming interface can transmit the translated wire request to the processing application.

The processing application can process the wire request by ensuring that the wire request is error-free and validated. To do so, the processing application can generate and perform a workload of one or more processes. The processes can include validation processes that can validate the identity of the user initiating the wire request. Additionally, the processing application may perform processes that identify errors in the wire request. For example, the processing application may identify that the recipient in the translated wire request is spelled "Lnondon," which may not be associated with any known organizational entity. To correct the error, the processing application may transmit a notification to the client device via the application programming interface. In some examples, the application programming interface may translate the notification to the first protocol for the client device. Additionally, the application programming interface may translate the corrected wire request received from the client device from the first protocol to the second protocol. The translated and corrected wire request may then be transmitted by the application programming interface to the processing application. This can allow the processing application to finish processing of the translated wire request.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for translating protocols for wire requests 104 according to some examples of the present disclosure. The computing environment 100 can include an API 102 that can communicate with client devices 106a-b via one or more networks 108, such as a public data network, a private data network, or some combination thereof. A data network may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN).

The API 102 can receive wire requests 104 from a first client device 106a. Specifically, the API 102 can receive a wire request 104 from a first wire-transfer application 110a executed by the first client device 106a. The first wire-transfer application 110a can have a first interface 112a at which the wire request 104 was provided by a user. The wire request 104 may be formatted according to a first protocol 114a corresponding to the first interface 112a. The wire request 104 may be a request for a wire transfer between two entities, which may be operating the first client device 106a and the second client device 106b respectively. Examples of the client devices 110a-b can include desktop computers, servers, videogame consoles, mobile phones (e.g., cellular phones), PDAs, tablet computers, net books, laptop computers, hand-held specialized readers, and wearing devices such as smart watches.

The computing environment 100 can also include a second wire-transfer application 110b and a third wire-transfer application 110c that are communicatively coupled to the API 102. The second wire-transfer application 110b can process wire requests 104 before transmitting the processed wire requests to the third wire-transfer application 110c, which can perform the requested wire transfer. The second wire-transfer application 110b can receive wire requests 104 by interacting with a second interface 112b. But, wire requests 104 may need to be transmitted to the second interface 112b in a second protocol 114b that is compatible with the second wire-transfer application 110b. It may be difficult or time-consuming for users accessing the first wire-transfer application 110a to switch to the second wire-transfer application 110b to complete a wire request 104. Additionally, the first protocol 114a for the first wire-transfer application 110a may differ from the second protocol 114b for the second wire-transfer application 110b, and the second protocol 114b may be unknown to the user. Thus, the API 102 can allow a user to provide wire requests 104 using their typical third-party application, such as the first wire-transfer application 110a, under a first protocol 114a.

After receiving the wire request 104 from the first wire-transfer application 110a, the API 102 can translate the wire request 104 from the first protocol 114a to the second protocol 114b associated with the second wire-transfer application 110b. The API 102 can generate a translated wire request 116 based on characteristics 118 of the wire request 104. For example, the API 102 can identify characteristics 118 of the wire request 104 that outline which two entities are requested to have a wire transfer in the wire request 104. The API 102 can then translate the portion of the wire request 104 outlining the two entities into a translated wire request 116 that specifies the two requested entities as required in the second protocol 114b. The translated wire request 116 can have the format (e.g., the second protocol 114b) that is compatible with the second wire-transfer application 110b. After generating the translated wire request 116, the API 102 can transmit the translated wire request 116 to the second wire-transfer application 110b.

The second wire-transfer application 110b may generate an automated process 120 (e.g., a workflow) for the translated wire request 116. For example, the second wire-transfer application 110b can determine approval or authentication processes that must be performed for the wire request 104 before authorizing the wire transfer by the third wire-transfer application 110c. Such processes can be based on characteristics 118 of the translated wire request 116. The characteristics 118 can include at least one of a destination for the translated wire request 116, a geographical location associated with the translated wire request 116, a value specified in the translated wire request 116, a type of the translated wire request 116, or an approval process for the translated wire request 116. Rules may govern different processes in the automated process 120 based on different characteristics 118. For example, international wire transfers may require more authentication processes than domestic wire transfers. Additionally, wire transfers with values over a certain threshold may be blocked or flagged for further verification. After generating the automated process 120, the second wire-transfer application 110b can then perform the automated process 120 to process the translated wire request 116, producing a processed wire request 122.

In some examples, the API 102 can receive an indication 128 of an error 124 with respect to a component 126 of the processed wire request 122 or the translated wire request 116. For example, the second wire-transfer application 110b can identify that the processed wire request 122 included an approval process approved by the first client device 106a. But, a rule may specify that an initiator (e.g., the first client device 106a) of a wire request 104 cannot also approve the wire request 104. Thus, the second wire-transfer application 110b can transmit an indication 128 of the error 124 to the API 102. The indication 128 may be formatted in the second protocol 114b. In response, the API 102 can generate an error notification 130 that has the first protocol 114a, and can transmit the error notification 130 to the first wire-transfer application 110a. A user of the first client device 106a can then update the wire request 104 via the first interface 112a with a correction 132 to the component 126, thus addressing the error 124. The first wire-transfer application 110a can transmit the correction 132 to the API 102. But, the correction 132 may be transmitted in the first protocol 114a. Thus, the API 102 can translate the format of the correction 132 to the second protocol 114b to generate a translated correction 134. The translated correction 134 can then be transmitted to the second wire-transfer application 110b, which can then proceed with processing and transmitting the associated wire request.

After performing the automated process 120 and addressing any identified errors 124, the second wire-transfer application 110b can transmit the processed wire request 122 to the third wire-transfer application 110c. The third wire-transfer application 110c can perform the requested wire transfer between two entities, such as the first client device 106a and the second client device 106b. After submission, the third wire-transfer application 110c can transmit a status update 136 to the second wire-transfer application 110b. The status update 136 can include confirmation of a successful wire transfer, notification of an issue or failure of the wire transfer, or any other update to the wire transfer. The second wire-transfer application 110b can forward the status update 136 to the first wire-transfer application 110a via the API 102.

The second wire-transfer application 110b may keep records of wire transfers. For example, after the wire requested by the wire request 104 is performed by the third wire-transfer application 110c, the second wire-transfer application 110b can generate an entry 138 in a wire database 140. The entry 138 can include the processed wire request 122 and the status of the associated wire transfer. In some examples, the status update 136 transmitted to the first wire-transfer application 110a can be retrieved from the entry 138. But, frequent accessing of the entries 138 in the wire database 140 can pose a security risk and may increase latency of the second wire-transfer application 110b. Therefore, the second wire-transfer application 110b can periodically transfer data from the wire database 140 to a reporting database 142. For example, the second wire-transfer application 110b may determine that a threshold 144 amount of time (such as thirty minutes) has been exceeded. In response, the second wire-transfer application 110b can copy entries 138 from the wire database 140 to the reporting database 142. Status updates 136 can then be determined using the entries 138 in the reporting database 142.

Entries 138 in the reporting database 142 can also be updated for easier searching. For example, the second wire-transfer application 110b can assign an identification number 146 to the entry 138 for the wire request 104. The identification number 146 can be assigned based on the origin of the wire request 104, the batch of requests in which the wire request 104 was received, or any other characteristic of the wire request 104. Subsequently, the API 102 can receive a search query 148 from the first client device 106a to provide a status update 136 for wire transfers with the identification number 146. The API 102 can translate the search query 148 from the first protocol 114a to the second protocol 114b. Then, the API 102 can send the search query 148 to the second wire-transfer application 110b. Then, the second wire-transfer application 110b can identify all entries 138 in the reporting database 142 that have the identification numbers 146 to fulfill the request. Because the search query 148 is fulfilled without interaction with the third wire-transfer application 110c, latency for the third wire-transfer application 110c can be reduced. Computing resources for the third wire-transfer application 110c can be dedicated to performing wire transfers rather than fulfilling database requests.

In some examples, memory usage for the second wire-transfer application 110b can be reduced by archiving old entries in the wire database 140. For example, the second wire-transfer application 110b can determine that a particular entry 138 has been present in the wire database 140 for longer than a threshold 144 amount of time, such as one year. In response, the second wire-transfer application 110b can archive the entry 138 by copying the entry 138 to an archival database 150 and removing the entry 138 from the wire database 140. When the first wire-transfer application 110a transmits another search query 148 for the entry 138, the second wire-transfer application 110b can determine that the entry 138 is no longer in the wire database 140. Thus, the second wire-transfer application 110b can access the archival database 150 to access the archived entry 138 to fulfill the search query 148.

Although FIG. 1 depicts a certain number and arrangement of components, this is for illustrative purposes and intended to be non-limiting. Other examples may include more components, fewer components, different components, or a different arrangement of the components shown in FIG. 1.

Figure 2:
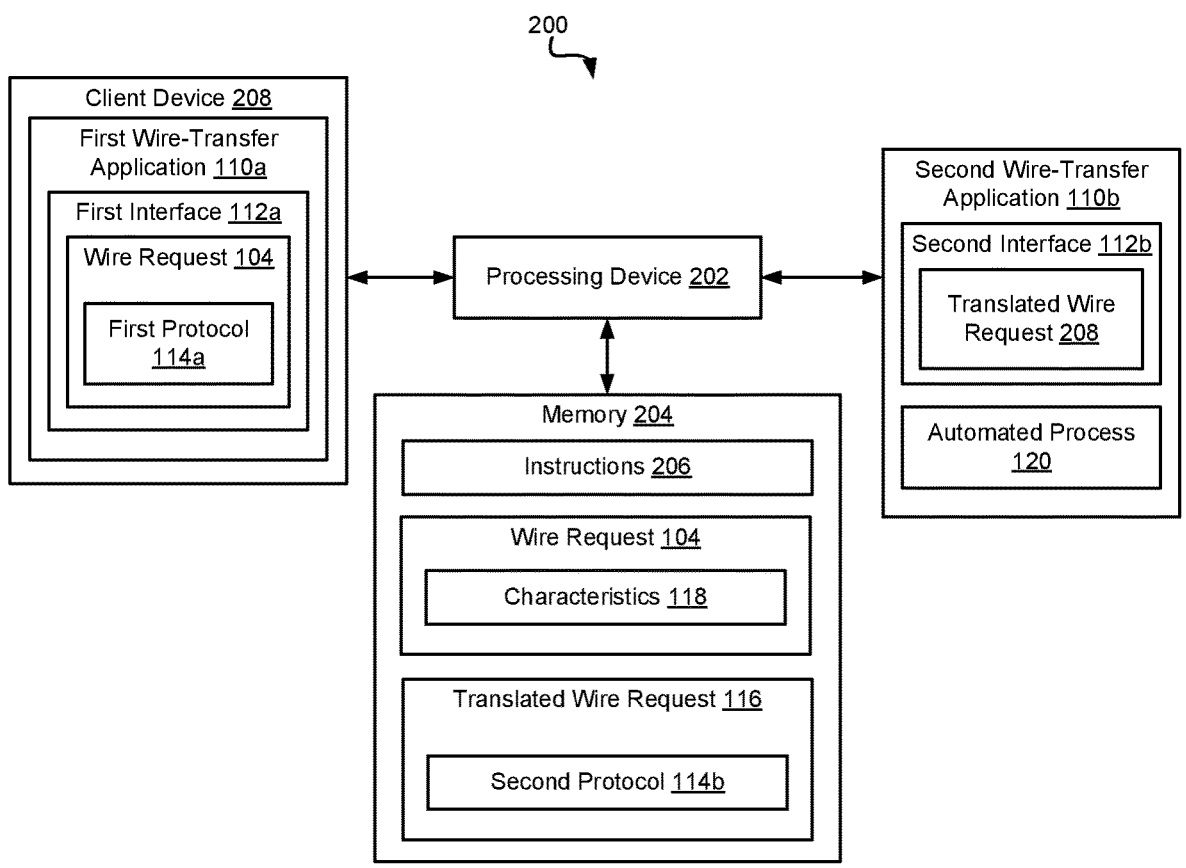
FIG. 2 is a block diagram of an example of a computing environment for translating protocols for wire requests according to some examples of the present disclosure.

FIG. 2 is a block diagram of an example of a computing environment 200 for translating protocols for wire requests 104 according to some examples of the present disclosure. The computing environment 200 depicted in FIG. 2 includes a processing device 202 communicatively coupled to a memory 204.

The processing device 202 can include one processor or multiple processors. Non-limiting examples of the processing device 202 include a Field-Programmable Gate Array (FPGA), an application-specific integrated circuit (ASIC), a microprocessor, etc. The processing device 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory can include a non-transitory computer-readable medium from which the processing device 202 can read instructions 206. A computer-readable medium can include electronic, optical, magnetic, or other storage devices capable of providing the processing device with computer-readable instructions or other program code. Examples of a computer-readable medium include magnetic disk(s), memory chip(s), ROM, RAM, an ASIC, a configured processor, optical storage, or any other non-transitory medium from which a computer processor can read the instructions 206.

In some examples, the processing device 202 can receive a wire request 104 transmitted from a first wire-transfer application 110a executed by a client device 208. The wire request 104 can be a request to perform a wire transfer between two entities. The wire request 104 may be provided via a first interface 112a for the first wire-transfer application 110a and may have a first protocol 114a. The processing device 202 can generate a translated wire request 116 that is compatible with a second protocol 114b by translating the wire request 104 from the first protocol 114a to the second protocol 114b. The second protocol 114b can be associated with a second interface 112b for a second wire-transfer application 110b that can process wire requests. The wire request 104 can be translated to the second protocol 114b based on characteristics 118 of the wire request 104. The processing device 202 can then transmit the translated wire request 116 to the second wire-transfer application 110b. The second wire-transfer application 110b can generate an automated process 120 for processing the translated wire request 116. The automated process 120 can be performed prior to performing the wire transfer between the two entities, as requested by the wire request 104.

Figure 3:
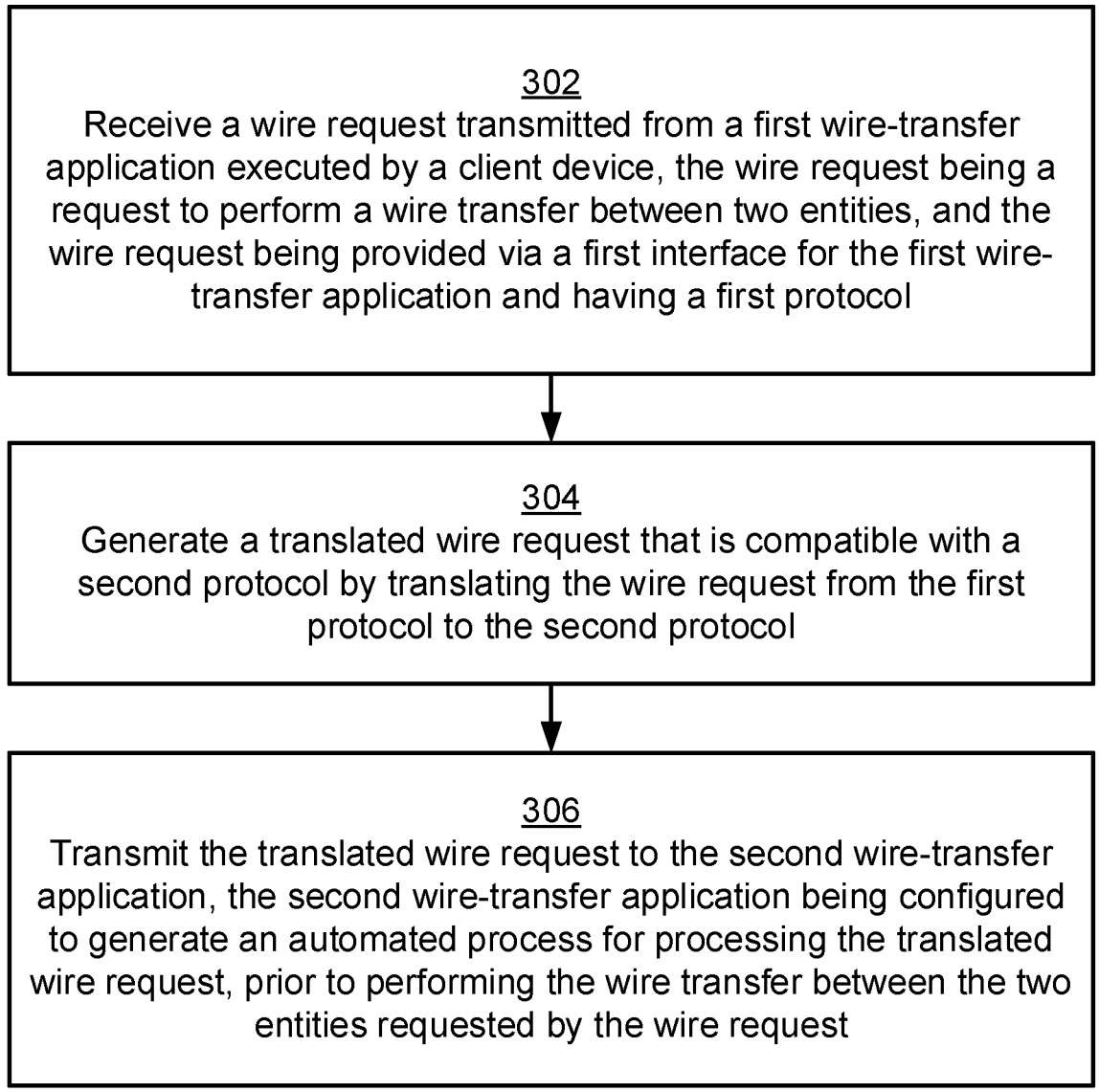
FIG. 3 is a flowchart of a process for translating protocols for wire requests in a computing environment according to some examples of the present disclosure.

FIG. 3 is a flowchart of a process for translating protocols for wire requests 104 in a computing environment 200 according to some examples of the present disclosure. FIG. 3 is described with references to components in FIGS. 1-2. Other examples can include more steps, fewer steps, different steps, or a different order of the steps than is depicted in FIG. 3.

At block 302, the processing device 202 can receive a wire request 104 transmitted from a first wire-transfer application 110a executed by a client device 208. The wire request 104 can be a request to perform a wire transfer between two entities, and the wire request 104 can be provided via a first interface 112a for the first wire-transfer application 110a. The wire request 104 can have a first protocol 114a. In some examples, the wire request 104 can be a request to wire a value of money from a first client device 106a to a second client device 106b. The first interface 112a may be unique to the first wire-transfer application 110a, and the wire request 104 may therefore have the first protocol 114a which may involve data that is formatted in a particular order or file format.

At block 304, the processing device 202 can generate a translated wire request 116 that is compatible with a second protocol 114b by translating the wire request 104 from the first protocol 114a to the second protocol 114b. The second protocol 114b can be associated with a second interface 112b for a second wire-transfer application 110b that can process wire requests 104. The processing device 202 can translate the wire request 104 based on characteristics 118 of the wire request 104. The second protocol 114b may differ from the first protocol 114a. For example, the second protocol 114b may require data in the wire request 104 to be formatted in a file format that is different than the first protocol 114a. The processing device 202 can therefore convert the wire request 104 into a translated wire request 116 with the different file format. In another example, fields in the wire request 104 (e.g., initiator, recipient, value, etc.) may be in a different order than is required by the second protocol 114b. The processing device 202 can identify required fields in the wire request 104 and reorder them to generate the translated wire request 116.

At block 306, the processing device 202 can transmit the translated wire request 116 to the second wire-transfer application 110b. The second wire-transfer application 110b can generate an automated process 120 for processing the translated wire request 116 prior to performing the wire transfer between the two entities requested by the wire request 104. The second wire-transfer application 110b can generate the automated process 120 by selecting one or more processes from a set of predefined processes. For example, before a wire transfer can be performed, the second wire-transfer application 110b may approve or deny the wire requests using validation processes. The automated process 120 can include one or more validation processes that can be performed by different entities depending on characteristics 118 of the translated wire request 116. For example, wire transfers involving particular geographical locations may be blocked or may involve higher-level validation processes.

The second wire-transfer application 110b can perform the automated process 120 to process the translated wire request 116, thus generating a processed wire request 122. Processed wire requests 122 are ready to be fulfilled. The second wire-transfer application 110b can then transmit the processed wire request 122 to the third wire-transfer application 110c. The third wire-transfer application 110c can perform the requested wire transfer by wiring money from the first client device 106a to the second client device 106b. Status updates 136 on the wire transfer can be transmitted to the second wire-transfer application 110b, then to the processing device 202, and then to the client device 208.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processing device; and
   a memory comprising instructions that are executable by the processing device for causing the processing device to execute an application-programming interface to:
   receive a wire request transmitted from a first wire-transfer application executed by a client device, the wire request being a request to perform a wire transfer between two entities, the wire request being provided via a first interface for the first wire-transfer application, and the wire request having a first protocol that is compatible with the first wire-transfer application and incompatible with a second wire-transfer application configured to process wire requests;
   generate a translated wire request by translating the wire request from the first protocol to a second protocol, wherein the second protocol is compatible with a second interface for the second wire-transfer application, wherein the wire request is translated to the second protocol based on characteristics of the wire request, and wherein the wire request is translated from the first protocol to the second protocol to prevent an interoperability problem between the first wire-transfer application and the second wire-transfer application, wherein generating the translated wire request further comprises:
   identifying a first order of fields in the wire request, wherein the first order differs from a second order required by the second protocol; and
   reordering the fields in the wire request according to the second order;
   transmit the translated wire request to the second wire-transfer application, wherein the second wire-transfer application is configured to generate an automated process for processing the translated wire request, prior to performing the wire transfer between the two entities requested by the wire request;
   generate, in response to receiving an indication of an error with respect to a component of the translated wire request from the second wire-transfer application, an error notification according to the first protocol;

transmit the error notification to the first wire-transfer application;

receive a correction to the component from the first wire-transfer application subsequent to transmitting the error notification;

generate a translated correction by translating the correction from the first protocol to the second protocol; and transmit the translated correction to the second wire-transfer application.

2. The system of claim 1, wherein the second wire-transfer application is configured to generate the automated process for processing the translated wire request based on one or more characteristics of the translated wire request, wherein the one or more characteristics comprise at least one of:

a destination for the translated wire request;

a value specified in the translated wire request; and a type of the translated wire request.

3. The system of claim 1, wherein the second wire-transfer application is configured to, subsequent to generating the automated process for processing the translated wire request:

perform the automated process to process the translated wire request;

in response to performing the automated process, transmit the processed wire request to a third wire-transfer application configured to perform the wire transfer between the two entities requested by the wire request;

subsequent to transmitting the processed wire request to the third wire-transfer application, receive a status update related to the transmitted wire request; and transmit the status update to the first wire-transfer application.

4. The system of claim 3, wherein the second wire-transfer application is configured to:

generate an entry for the wire request in a wire database;

subsequent to generating the entry for the wire request in the wire database, determine that a threshold amount of time has been exceeded;

in response to determining that the threshold amount of time has been exceeded, copy entries from the wire database to a reporting database; and determine the status update to the wire request based on the entry associated with the wire request in the reporting database.

5. The system of claim 4, wherein the second wire-transfer application is configured to:

assign a particular identification number to the entry associated with the wire request in the reporting database;

receive a search query for wire requests with the particular identification number from the first wire-transfer application;

in response to receiving the search query, identify, based on the particular identification number, the wire request in the reporting database; and in response to identifying the wire request, transmit the entry for the wire request to the first wire-transfer application.

6. The system of claim 4, wherein the second wire-transfer application is configured to:

determine that a particular entry has been present in the wire database for longer than another threshold amount of time; and in response to determining that the particular entry has been present in the wire database for longer than the other threshold amount of time, archive the particular entry by copying the particular entry in an archival database and removing the particular entry from the wire database.

7. The system of claim 1, wherein the first protocol comprises a first file format, and wherein the second protocol comprises a second file format.

8. A method comprising:

receiving, by a processing device executing an application-programming interface, a wire request transmitted from a first wire-transfer application executed by a client device, the wire request being a request to perform a wire transfer between two entities, the wire request being provided via a first interface for the first wire-transfer application, and the wire request having a first protocol that is compatible with the first wire-transfer application and incompatible with a second wire-transfer application configured to process wire requests;

generating, by the processing device executing the application-programming interface, a translated wire request by translating the wire request from the first protocol to a second protocol, wherein the second protocol is compatible with a second interface for the second wire-transfer application, wherein the wire request is translated to the second protocol based on characteristics of the wire request, and wherein the wire request is translated from the first protocol to the second protocol to prevent an interoperability problem between the first wire-transfer application and the second wire-transfer application, wherein generating the translated wire request further comprises:

identifying a first order of fields in the wire request, wherein the first order differs from a second order required by the second protocol; and reordering the fields in the wire request according to the second order;

transmitting, by the processing device executing the application-programming interface, the translated wire request to the second wire-transfer application, wherein the second wire-transfer application is configured to generate an automated process for processing the translated wire request, prior to performing the wire transfer between the two entities requested by the wire request;

generating, by the processing device executing the application-programming interface and in response to receiving an indication of an error with respect to a component of the translated wire request from the second wire-transfer application, an error notification according to the first protocol;

transmitting, by the processing device executing the application-programming interface, the error notification to the first wire-transfer application;

receiving, by the processing device executing the application-programming interface, a correction to the component from the first wire-transfer application subsequent to transmitting the error notification;

generating, by the processing device executing the application-programming interface, a translated correction by translating the correction from the first protocol to the second protocol; and transmitting, by the processing device executing the application-programming interface, the translated correction to the second wire-transfer application.

9. The method of claim 8, wherein the second wire-transfer application generates the automated process for processing the translated wire request based on the one or more characteristics of the translated wire request, wherein the one or more characteristics comprise at least one of:
a destination for the translated wire request;
a value specified in the translated wire request; and
a type of the translated wire request.

10. The method of claim 8, further comprising, subsequent to generating the automated process for processing the translated wire request, by the second wire-transfer application:
performing the automated process to process the translated wire request;
in response to performing the automated process, transmitting the processed wire request to a third wire-transfer application configured to perform the wire transfer between the two entities requested by the wire request;
subsequent to transmitting the processed wire request to the third wire-transfer application, receiving a status update related to the transmitted wire request; and
transmitting the status update to the first wire-transfer application.

11. The method of claim 10, further comprising, by the second wire-transfer application:
generating an entry for the wire request in a wire database;
subsequent to generating the entry for the wire request in the wire database, determining that a threshold amount of time has been exceeded;
in response to determining that the threshold amount of time has been exceeded, copying entries from the wire database to a reporting database; and
determining the status update to the wire request based on the entry associated with the wire request in the reporting database.

12. The method of claim 11, further comprising, by the second wire-transfer application:
assigning a particular identification number to the entry associated with the wire request in the reporting database;
receiving a search query for wire requests with the particular identification number from the first wire-transfer application;
in response to receiving the search query, identifying, based on the particular identification number, the wire request in the reporting database; and
in response to identifying the wire request, transmitting the entry for the wire request to the first wire-transfer application.

13. The method of claim 11, further comprising, by the second wire-transfer application:
determining that a particular entry has been present in the wire database for longer than another threshold amount of time; and
in response to determining that the particular entry has been present in the wire database for longer than the other threshold amount of time, archiving the particular entry by copying the particular entry in an archival database and removing the particular entry from the wire database.

14. The method of claim 8, wherein the first protocol comprises a first file format, and wherein the second protocol comprises a second file format.

15. A non-transitory computer-readable medium comprising program code that is executable by a processing device for causing the processing device to execute an application-programming interface to:
receive a wire request transmitted from a first wire-transfer application executed by a client device, the wire request being a request to perform a wire transfer between two entities, the wire request being provided via a first interface for the first wire-transfer application, and the wire request having a first protocol that is compatible with the first wire-transfer application and incompatible with a second wire-transfer application configured to process wire requests;
generate a translated wire request by translating the wire request from the first protocol to a second protocol, wherein the second protocol is compatible with a second interface for the second wire-transfer application, wherein the wire request is translated to the second protocol based on characteristics of the wire request, and wherein the wire request is translated from the first protocol to the second protocol to prevent an interoperability problem between the first wire-transfer application and the second wire-transfer application, wherein generating the translated wire request further comprises:
identifying a first order of fields in the wire request, wherein the first order differs from a second order required by the second protocol; and
reordering the fields in the wire request according to the second order;
transmit the translated wire request to the second wire-transfer application, wherein the second wire-transfer application is configured to generate an automated process for processing the translated wire request, prior to performing the wire transfer between the two entities requested by the wire request;
generate, in response to receiving an indication of an error with respect to a component of the translated wire request from the second wire-transfer application, an error notification according to the first protocol;
transmit the error notification to the first wire-transfer application;
receive a correction to the component from the first wire-transfer application subsequent to transmitting the error notification;
generate a translated correction by translating the correction from the first protocol to the second protocol; and
transmit the translated correction to the second wire-transfer application.

16. The non-transitory computer-readable medium of claim 15, wherein the second wire-transfer application is configured to generate the automated process for processing the translated wire request based on the one or more characteristics of the translated wire request, wherein the one or more characteristics comprise at least one of:
a destination for the translated wire request;
a value specified in the translated wire request; and
a type of the translated wire request.

17. The non-transitory computer-readable medium of claim 15, wherein the second wire-transfer application is configured to, subsequent to generating the automated process for processing the translated wire request:
perform the automated process to process the translated wire request;
in response to performing the automated process, transmit the processed wire request to a third wire-transfer application configured to perform the wire transfer between the two entities requested by the wire request;

subsequent to transmitting the processed wire request to the third wire-transfer application, receive a status update related to the transmitted wire request; and transmit the status update to the first wire-transfer application.

18. The non-transitory computer-readable medium of claim 17, wherein the second wire-transfer application is configured to:

generate an entry for the wire request in a wire database;

subsequent to generating the entry for the wire request in the wire database, determine that a threshold amount of time has been exceeded;

in response to determining that the threshold amount of time has been exceeded, copy entries from the wire database to a reporting database; and determine the status update to the wire request based on the entry associated with the wire request in the reporting database.

19. The non-transitory computer-readable medium of claim 18, wherein the second wire-transfer application is configured to:

identify a particular characteristic associated with the wire request;

in response to identifying the particular characteristic, assign a particular identification number to the entry associated with the wire request in the reporting database;

receive a search query for wire requests with the particular characteristic from the first wire-transfer application;

in response to receiving the search query, identify, based on the particular identification number, the wire request in the reporting database; and in response to identifying the wire request, transmit the entry for the wire request to the first wire-transfer application.

20. The non-transitory computer-readable medium of claim 15, wherein the first protocol comprises a first file format, and wherein the second protocol comprises a second file format.

* * * * *